US009584992B2

(12) United States Patent
Papakipos et al.

(10) Patent No.: US 9,584,992 B2
(45) Date of Patent: Feb. 28, 2017

(54) LOW POWER HIGH FREQUENCY SOCIAL UPDATES FOR MOBILE DEVICES

(75) Inventors: Matthew Nicholas Papakipos, Palo Alto, CA (US); Michael John McKenzie Toksvig, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 690 days.

(21) Appl. No.: 13/289,962

(22) Filed: Nov. 4, 2011

(65) Prior Publication Data

US 2013/0115980 A1 May 9, 2013

(51) Int. Cl.

*H04W 4/00* (2009.01)
*H04W 4/20* (2009.01)
*H04W 4/14* (2009.01)
*H04W 76/04* (2009.01)

(52) U.S. Cl.

CPC .............. *H04W 4/206* (2013.01); *H04W 4/14* (2013.01); *H04W 76/046* (2013.01)

(58) Field of Classification Search

CPC ................................ G06Q 50/01; H04W 4/26
USPC ...... 455/466, 513, 69, 404.2, 41.2; 709/206, 709/203, 204
See application file for complete search history.

(56) References Cited

U.S. PATENT DOCUMENTS 6,072,784 A * 6/2000 Agrawal et al. .............. 370/311
2008/0254814 A1* 10/2008 Harris et al. .................. 455/458
2011/0119258 A1* 5/2011 Forutanpour et al. ........ 707/723

OTHER PUBLICATIONS

"Universal Mobile Telecommunications System (UMTS); Radio Resource Control (RRC); Protocol specification," 3GPP TS 25.331 version 10.4.0 Release, Jul. 10, 2011.
"Enhanced SCRI approach for fast dormancy," R2-087149, Change Request 25.331 CR 3483 rev. 2, version 8.4.0, 3GPP TSG-RAN2 Meeting #64, Prague, Czech Republic, Nov. 2008.
"Clarification on the UE state after fast dormancy request," R2-097173, Change Request 25.331 CR 3894, version 9.0.0, 3GPP TSG-RAN WG2 Meeting #68, Jeju, South Korea, Nov. 2009.
UE Fast Dormancy upon SRNS relocation,: R2-101939, Change Request 25.331 CR 4088 rev. 2, version 9.1.0, 3GPP TSG-RAN WG2 Meeting #69, San Francisco, Feb. 2010.
"Correction to Fast Dormancy," R2-10726, Change Request 25.331 CR 4117, version 9.1.0, 3GPP TSG-RAN WG2 Meeting #69, San Francisco, CA, Feb. 2010.
"Fast Dormancy correction for releasing radio bearers," R2-112706, Change Request 25.331 CR 4598, version 10.3.1, 3GPP TSG-RAN WG2 Meeting #74, Barcelona, Spain, May 2011.

* cited by examiner

*Primary Examiner* — Kiet Doan
(74) *Attorney, Agent, or Firm* — Baker Botts L.L.P.

(57) ABSTRACT

In one embodiment, a mobile device determines a notification mode based on the mobile device's user interface mode, and transmits a message comprising the notification mode to a server, causing the server to transmit one or more messages to the mobile device based on the notification mode.

12 Claims, 10 Drawing Sheets

131
112
122
Message Service #1
Server 120
Network Cloud 121
Message Service #2
Message Service #3
132

LOW POWER HIGH FREQUENCY SOCIAL UPDATES FOR MOBILE DEVICES

TECHNICAL FIELD

This disclosure generally relates to data communication.

BACKGROUND

When two computing devices are connected to a network, data may be transmitted between the two devices over the network using one or more suitable network protocols. A network can be the Internet, a corporate intranet, a virtual private network, a local area network, a wireless local area network, a cellular network, a wide area network, a metropolitan area network, or a combination of two or more such networks.

A social networking system, such as a social networking website, enables its users to interact with it and with each other through the system. The social networking system may create and store a record, often referred to as a user profile, in connection with the user. The user profile may include a user's demographic information, communication channel information, and personal interests. The social networking system may also create and store a record of a user's relationship with other users in the social networking system (e.g., social graph), as well as provide services (e.g., wall-posts, photo-sharing, event organization, messaging, games, or advertisements) to facilitate social interaction between users in the social networking system. The social networking system may transmit contents and messages related to its services to a user's client device over a network.

DETAILED DESCRIPTION

In data communication, a server may transmit one or more messages to a client device over a computer network. For example, a server system running an email exchange software may transmit via the Internet email messages to a user's client device (e.g., a desktop computer, a mobile phone, a tablet computer). The user can access the email messages received at the client device by using an email program (e.g., Microsoft Outlook) running on the mobile device.

Figure 1:
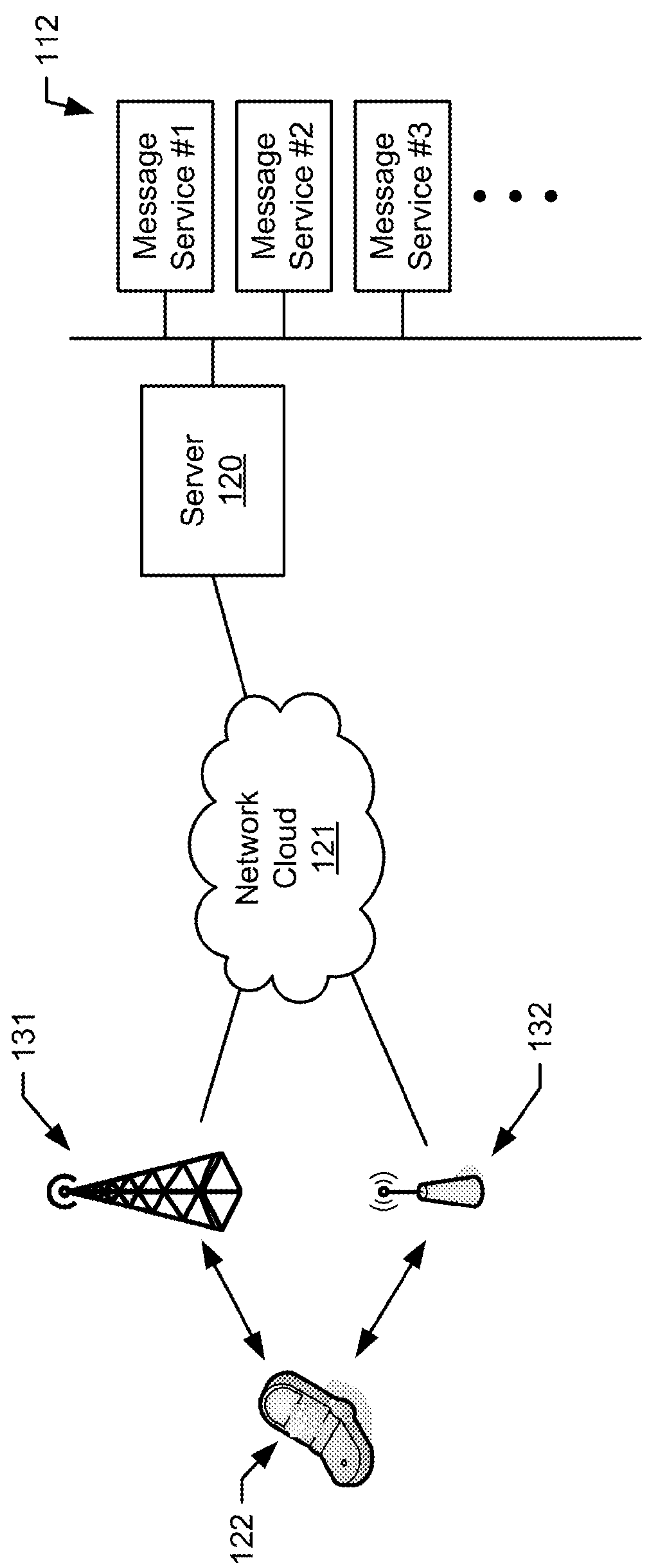
FIG. 1 illustrates an example network environment.

FIG. 1 illustrates an example network environment in which one or more messages may be transmitted from a server to a mobile device. In particular embodiments, server 120 may communicate with mobile device 122 and transmit one or more messages to mobile device 122 through network cloud 121. Server 120 may comprise one or more computers or computing devices. In particular embodiments, server 120 may be operably connected to one or more message services 112. Each message service 112 can be one or more computers or computing devices configured to transfer messages to one or more users. For example and without limitation, a messages can be an email, an instant message (IM), an Short Message Service (SMS) message, an Multimedia Messaging Service (MMS) message, a news item, an advertisement, a system update message, or any combinations of those. For example, a message can be a notification indicating a request to establish a real-time communication session (e.g., a phone call, a video call). For example, server 120 may access message services 112 for one or more outgoing messages for a user, and transmit the one or more outgoing messages to the user's mobile device 122 via network cloud 121.

Network cloud 121 generally represents a network or collection of networks (such as the Internet, a corporate intranet, a virtual private network, a local area network, a wireless local area network, a cellular network, a wide area network, a metropolitan area network, or a combination of two or more such networks) over which server 120 may communicate with mobile device 122.

Mobile device 122 is generally a portable computer or computing device including functionality for communicating (e.g., remotely) over a network. For example, mobile device 122 can be a mobile phone, a tablet computer, a laptop computer, a handheld game console, an electronic book reader, or any other suitable portable devices. Mobile device 122 may execute one or more client applications, such as a web browser (e.g., Microsoft Windows Internet Explorer, Mozilla Firefox, Apple Safari, Google Chrome, and Opera, etc.) or special-purpose client application (e.g., Microsoft Outlook, Facebook for iPhone, etc.), to access and view content and messages transmitted from server 120 over network cloud 121. In particular embodiments, mobile device 122 may connect to network cloud 121 via a base station 131 of a cellular network (e.g., a Global System for Mobile Communications or GSM cellular network, a Long Term Evolution or LTE network). In particular embodiments, mobile device 122 may connect to network cloud 121 via a wireless access point 132 of a WI-FI network.

A mobile device (e.g., a mobile phone, a tablet computer) often runs solely on its battery. Meanwhile, receiving messages over a wireless network can decrease (e.g., by the mobile device's wireless transceiver unit) substantial amount of energy stored in the mobile device's battery. With abundance of messages (such as described above) available for a user to consume at the user's mobile device, it is desirable to manage message transmission to the user's mobile device in order to conserve the mobile device's battery power. Particular embodiments herein describe methods of managing transmitting messages to a user's mobile device. More specifically, particular embodiments manage transmitting messages to a user's mobile device based on the user's interaction with the mobile device. For example, particular embodiments can transmit one or more messages in real-time to a user's mobile device if the user is actively interacting with the mobile device (e.g., the user is accessing one or more applications running on the mobile device). For example, particular embodiments can transmit one or more messages to the user's mobile device only as the user requests, if the user is not actively interacting with the mobile device while the mobile device is not near the user (e.g., the user may be asleep).

Figure 2:
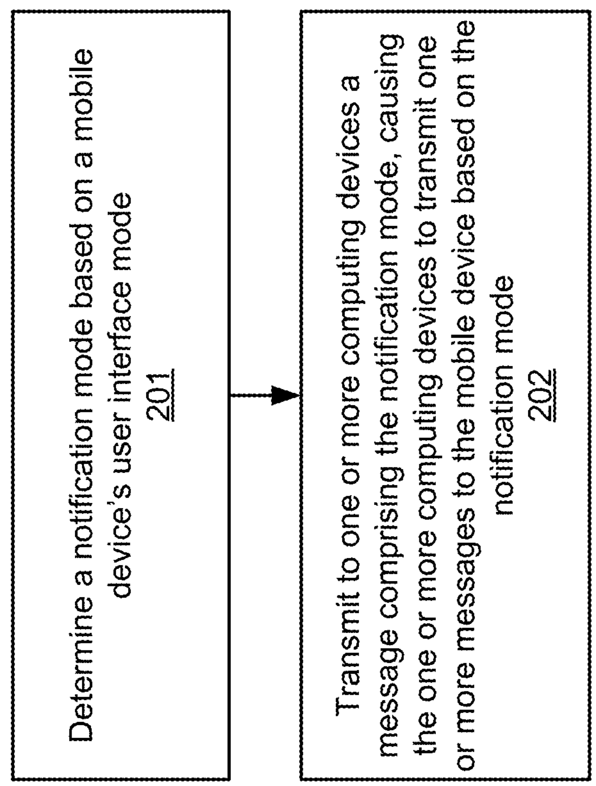
FIG. 2 illustrates an example method of managing message transmission from a server to a mobile device based on the mobile device's user interface mode.

FIG. 2 illustrates an example method of managing message transmission from a server to a mobile device based on the mobile device's user interface mode. The example method of FIG. 2 can be implemented by a notification mode manager process running on one or more processors of a mobile device of a user. For example, the mobile device can be a mobile phone, a tablet computer, a laptop computer, a handheld game console, an electronic book reader, or any other suitable portable devices. In particular embodiments, server 120 may communicate and transmit messages to the mobile device via network cloud 121 (e.g., the Internet), as illustrated in FIG. 1. In particular embodiments, the mobile device may connect to network cloud 121 via a base station 131 of a cellular network and/or an access point 122 of a WI-FI network, as illustrated in FIG. 1. In particular embodiments, the notification mode manager process may determine a notification mode based on the mobile device's user interface mode (201). In particular embodiments, the notification mode manager process may transmit to one or more computing devices (e.g., server 120) a message comprising the notification mode, causing the one or more computing devices to transmit one or more messages to the mobile device based on the notification mode (202).

Figure 3:
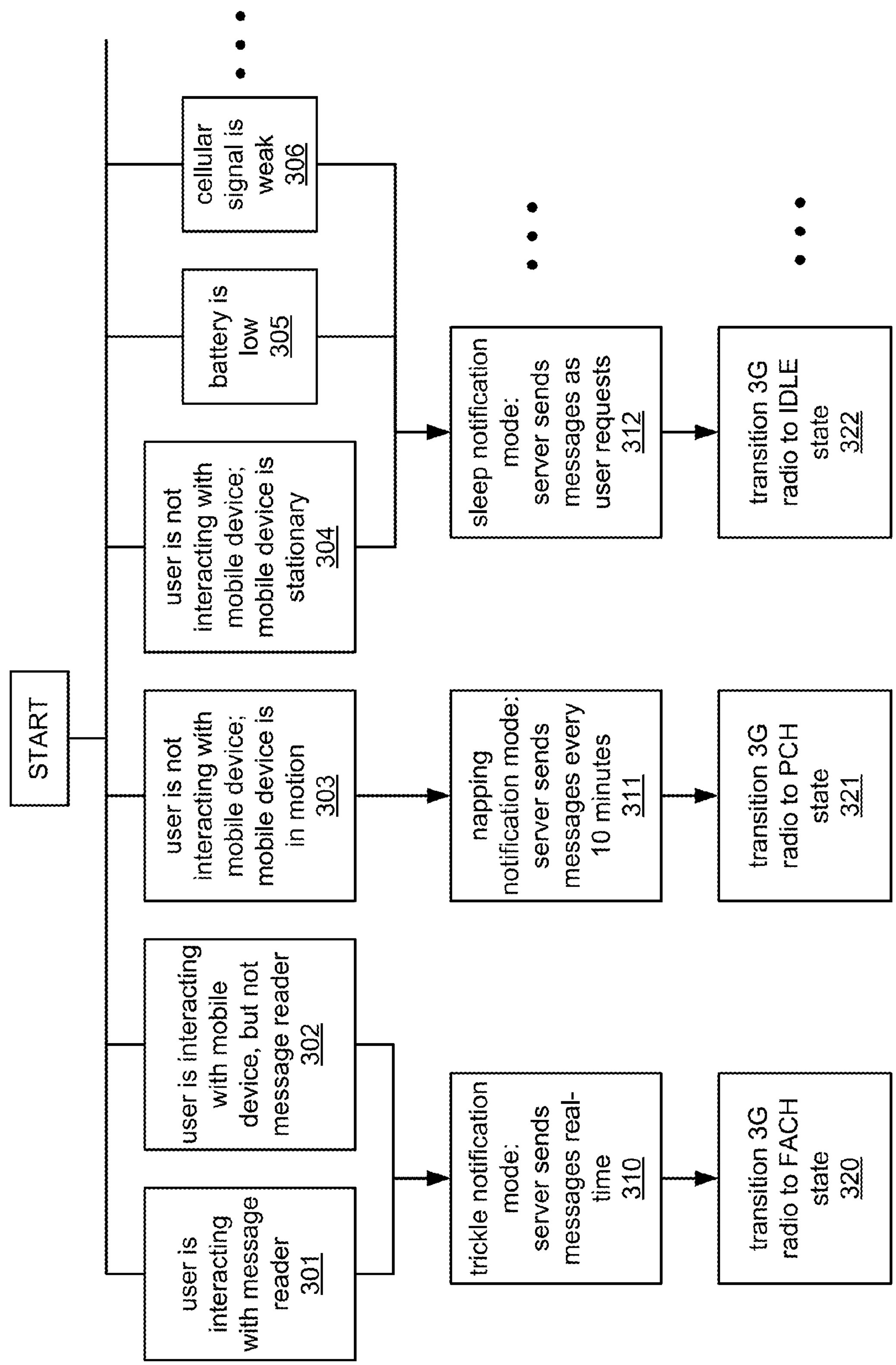
FIG. 3 illustrates examples of user interface modes and notification modes.

FIG. 3 illustrates examples of user interface modes and notification modes for the example method of FIG. 2. In particular embodiments, the notification mode manager process may determine a trickle notification mode based on a current user interface mode indicating that the user being actively interacting with the mobile device. The notification mode manager process may determine that the user is actively interacting with the mobile device if the user is interacting with one or more applications running on the mobile device. The notification mode manager process may determine whether the user is interacting with a particular application by determining whether the particular application's user interface receives user input or receives user interface focus within a pre-determined time duration (e.g., within the last 20 seconds). For example, the notification mode manager process can determine whether the particular application's user interface receives user input (or receives user interface focus) within a pre-determined time duration by accessing the mobile device's operating system or subscribing as an listener to user input events of the particular application.

For example, the notification mode manager process may determine whether the user is interacting with a message reader application running on the mobile device. For example, the notification mode manager process may determine whether the user is interacting with an application other than a message reader on the mobile device. A message reader can be a special-purpose client application (e.g., Microsoft Outlook, Facebook for iPhone). A message reader can also be a web browser displaying one or more structured documents (e.g., a web page, an iFrame) for accessing one or more messages (e.g., Google's Gmail web interface, Facebook web user interface). In particular embodiments, the notification mode manager process may determine a trickle notification mode (310) if the current user interface mode is that the user is interacting with a message reader application running on the mobile device (301) or that the user is interacting with an application other than a message reader on the mobile device (302), as illustrated in FIG. 3. In particular embodiments, the notification mode manager process may transmit to server 120 a message indicating the trickle notification mode, causing server 120 to transmit one or more messages to the mobile devices in real-time. For example, in response to the message indicating the trickle notification mode, a server-side process running on server 120 can access one or more message services 112 for one or more outgoing message for the user, and transmit the one or more outgoing messages to the user in real-time (e.g., whenever a new outgoing message is available).

In particular embodiments, the notification mode manager process may determine a napping notification mode based on a current user interface mode indicating that the user is not actively interacting with the mobile device while the mobile device is near the user—e.g., the mobile device can be in the user's pocket while the user walks or drives a car. The notification mode manager process may determine that the user is not interacting with the mobile device if no application running on the mobile device receives user input (nor user input focus) within a pre-determined time duration (e.g., with the last 3 minutes). In other embodiments, the notification mode manager process may determine that the user is not interacting with the mobile device if the mobile device's display is in a lower-power or lower-usage state (e.g., the display being powered down, or a screen saver or a screen lock program being active). The notification mode manager can determine that the mobile device is near the user if the mobile device is in motion (e.g., indicating that the user is carrying the mobile device). The notification mode manger can determine whether the mobile device is in motion by accessing a device driver of an accelerometer of the mobile device.

In particular embodiments, the notification mode manager process may determine a napping notification mode (311) if the user is not interacting with the mobile device while the mobile device is in motion (303), as illustrated in FIG. 3. In particular embodiments, the notification mode manger process may transmit to server 120 a message indicating the napping notification mode, causing server 120 to transmit one or more messages to the mobile device at a pre-determined time interval (e.g., every 10 minutes). For example, in response to the message indicating the napping notification mode, a server-side process running on server 120 can access one or more message services 112 for one or more outgoing messages for the user, and transmit the one or more outgoing messages to the mobile device every 10 minutes.

In particular embodiments, the notification mode manager process may determine a sleep notification mode based on a current user interface mode indicating that the user is not actively interacting with the mobile device while the mobile device is stationary for a pre-determined time duration (e.g., the mobile device is stationary for the last 15 minutes). For example, the user may be asleep. As described earlier, the notification mode manager process can determine that the user is not interacting with the mobile device if no application running on the mobile device receives user input (nor user input focus) with a pre-determined time duration. The notification mode manager process can also determine that the user is not interacting with the mobile device is the mobile device's display is in a lower-power or lower-usage state. The notification mode manager process can determine whether the mobile device is stationary or idle by accessing a device driver of an accelerometer of the mobile device.

In particular embodiments, the notification mode manger process may determine a sleep notification mode (312) if the user is not interacting with the mobile device while the mobile device is stationary (304), as illustrated in FIG. 3. In particular embodiments, the notification mode manager process may transmit to server 120 a message indicating the sleep notification mode, causing server 120 to transmit one or more messages to the mobile device as the user requests. That is, server 120 does not transmit messages to the mobile device unless the user requests to access messages. For example, the user may access a message reader application described earlier, causing the notification mode manger process to transmit to server 120 a message indicating a trickle notification mode (310) as described earlier. In response to the message indicating the trickle notification mode, a server-side process running on server 120 can access one or more message services 112 for one or more outgoing message for the user, and transmit the one or more outgoing messages to the user.

The notification mode manager process may determine notification modes based on different combinations of user interface modes. For example, the notification mode manager process may determine a napping notification mode if the user is interacting with an application other than a message reader application on the mobile device (302), or if the user is not interacting with the mobile device while the mobile device is in motion (303). The notification mode manager process may determine a trickle notification mode if the user is interacting with a message reader application running on the mobile device (301). The notification mode manager process may determine a sleep notification mode if the user is not interacting with the mobile device while the mobile device is stationary (304).

Furthermore, the notification mode manager process may determine a notification mode based on the mobile device's power state. For example, the notification mode manager process can access a device driver for the mobile device's battery and determine that the battery level is low (e.g., less than 20% charged). In order to conserver battery energy, notification mode manager process may determine a sleep notification mode (312) if the battery level is low (305), as illustrated in FIG. 3. In other embodiments, the notification mode manager process may determine a napping notification mode if the battery is close to fully charged (e.g., greater than 90% charged). The notification mode may determine a trickle notification mode if the battery is being charged.

The notification mode manager process may also determine a notification mode based on the mobile device's current radio network state. For example, the notification mode manager process can access a device driver of the mobile device's wireless communication subsystem and determine a signal strength of the current radio network connection (e.g., 4 out of 5 bars). For example, a radio network connection with a weak signal strength (e.g., 1 out of 5 bars) may not be efficient (thus consuming more energy) in data communication due to packet loss. The notification mode manager process may determine a sleep notification mode (312) if the current radio network connection's signal strength is low (306), as illustrated in FIG. 3.

Figure 3A:
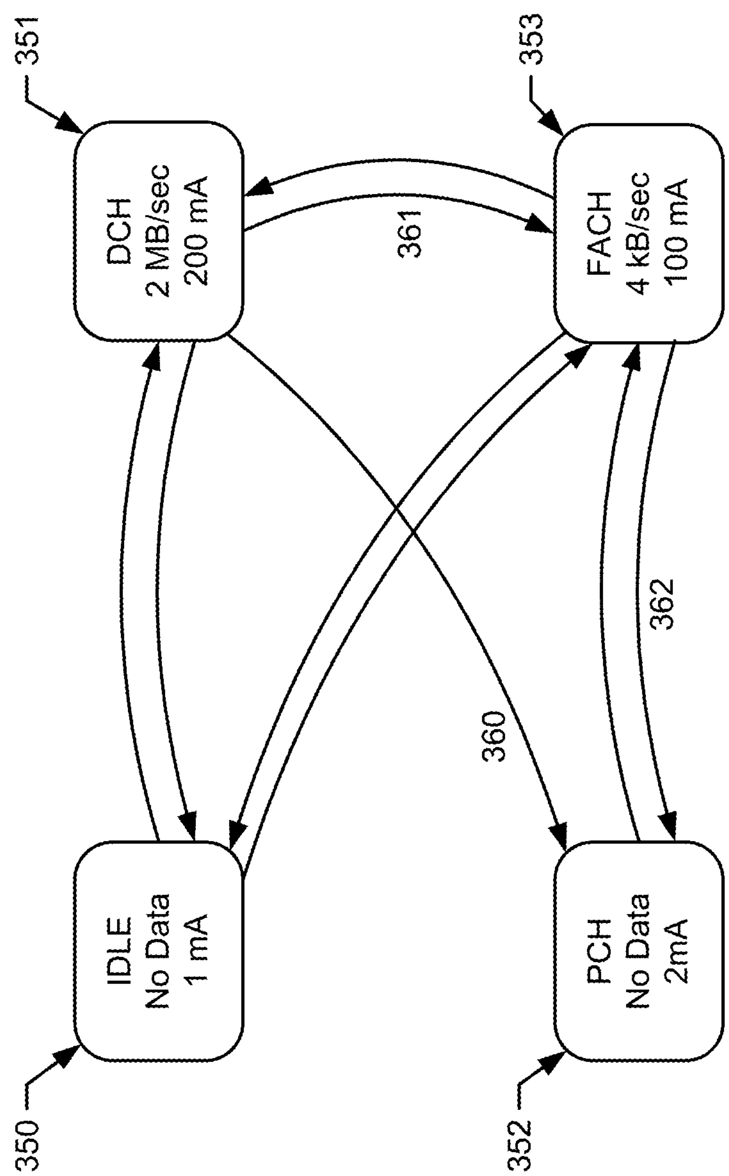
FIG. 3A illustrates example radio connection states.

Particular embodiments may further change the mobile device's radio network state based on a notification mode. For didactic purposes, FIG. 3A illustrates Radio Resource Control (RRC) connection modes for GSM and evolved UMTS (Universal Mobile Telecommunication System) Terrestrial Radio Access Network (E-UTRA) cellular network connections. This disclosure contemplates any combination of radio network states of any type of cellular network. In the example of FIG. 3A, after power-on, a mobile device stays in IDLE state (350) until the mobile device establishes a connection with a base station by transitioning to DCH (Dedicated Channel) connected mode (351) or FACH (Forward Access Channel) connected mode (353). In addition to DCH connected mode and FACH connected mode, the mobile device can also connect to the base station in PCH (Paging Channel) connected mode (352). Among the connected modes, DCH connected mode can have the highest data bandwidth and highest energy consumption (e.g., 2 MB/sec, 200 mA). FACH connected mode has lower data bandwidth but consumes about 50% of energy of DCH connected mode (e.g., 4 kB/sec, 100 mA). PCH connected mode has zero data bandwidth by consumes about 1-2% of energy of DCH connected mode (e.g., no data, 2 mA). The mobile device can transition from a higher power and data bandwidth connected state to a lower power and data bandwidth connected state (e.g., 360, 361, and 362 of FIG. 3A) to conserve energy consumption while remaining a connection with a base station. Transitions 360, 361, 362 can be triggered by using a timer. For example, the base station may transition the radio connection with the mobile device from a higher power and data bandwidth connected state to a lower power and data bandwidth connected state 10 seconds after the mobile device completes a data transfer session. The mobile device can also actively transfer the radio connection with the base station from a higher power and data bandwidth connected state to a lower power and data bandwidth connected state, without waiting for the timer to expire, by sending to the base station a request for transitioning to a lower power and bandwidth connected state (e.g., a fast dormancy request described in CR3483R2 in 3GPP TS 25.331 Release 8).

In particular embodiments, the notification mode manager process may determine a second radio network state based on the notification mode. In particular embodiments, the notification mode manager process may transmit to a cellular base station a request for the second radio network state, causing the base station to transition a connection between the mobile device and the cellular base station to the second radio network state. For example, the notification mode manager process may determine a sleep notification mode (312) based on a user interface mode (304), as illustrated in FIG. 3. Since during a sleep notification mode, server 120 does not send messages to the mobile device unless the user request, it is desirable to have a lower power and data bandwidth mode to conserve the mobile device's battery life. For example, the notification mode manager process can transmit to base station 131 a request for IDLE connected mode, causing base station 131 to transition the radio connection between the mobile device and base station 131 to IDLE connected mode (322). Similarly, for example, the notification mode manager process may determine a napping notification mode (311) based on a user interface mode (303), as illustrated in FIG. 3. The notification mode manager process can transmit to base station 131 a request for PCH connected mode, causing base station 131 to transition the radio connection between the mobile device and base station 131 to PCH connected mode (321). As yet for another example, the notification mode manager process may determine a trickle notification mode (310) based on a user interface mode (301 or 302), as illustrated in FIG. 3. The notification mode manager process can transmit to base station 131 a request for FACH connected mode, causing base station 131 to transition the radio connection between the mobile device and base station 131 to FACH connected mode (320).

Figure 4:
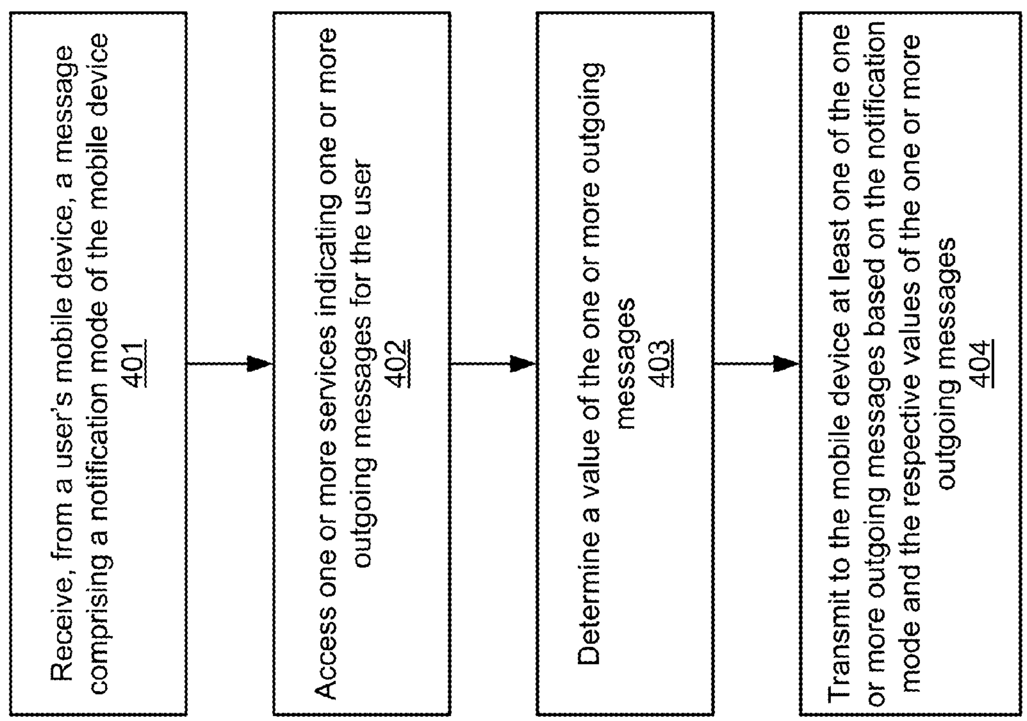
FIG. 4 illustrates another example method of managing message transmission from a server to a mobile device.

As described earlier, particular embodiments may determine a notification mode for a mobile device based on the mobile device's user interface mode. Particular embodiments may transmit to a server a message indicating the notification mode, causing the server to transmit messages to the mobile device based on the notification mode. For example, the server can transmit messages to the mobile device in real-time based if the notification mode is a trickle notification mode. For example, the server can transmit messages to the mobile device every 10 minutes if the notification mode is a napping notification mode. In addition to transmitting outgoing messages to the mobile device based on the notification mode, particular embodiments may transmit outgoing messages to the mobile device further based on a ranking of the outgoing messages, as illustrated in FIG. 4.

In particular embodiments, server 120 may receive from the user's mobile device a message comprising a notification mode (e.g., a trickle notification mode, a napping notification mode) of the mobile device (401). The message may further comprise an identifier (e.g., a user name, a phone number, an email address) of the user. In response to the message, a server-side process running on server 120 may access one or more message services 112 indicating one or more outgoing messages for the user (402). The server-side process may access one or more message services 112 for information for the one or more outgoing messages. For example, information for an outgoing message may comprise one or more identifiers (e.g., a user name, a phone number, an email address) of the outgoing message's originator.

In particular embodiments, the server-side process may determine a value for each of the one or more outgoing messages (403). In particular embodiments, the server-side process may determine a value for each of the one or more outgoing messages based on an affinity or social relevancy between each of the one or more outgoing messages and the user—i.e., based on an affinity between each outgoing message's originator and the user. For example, the server-side process may assign each of the one or more outgoing messages an affinity score. For example, the server-side process can assign an affinity score of 1.0 to an outgoing message if the outgoing message's originator is the user's immediate family members (e.g., parents, siblings), or an affinity coefficient of 0.9 if the outgoing message's originator frequently communicates with the user, or an affinity coefficient of 0.7 if the outgoing message's originator is the user's first-degree social contact in a social graph of a social networking system. Interaction between users on a social networking system, such as chats, wall posts, emails, and the like, can also be used in scoring affinities between users of the social networking system. Methods of measuring affinity scoring are described later.

Particular embodiments may transmit more outgoing messages to the mobile device if the user is interacting with the mobile device, while transmit less outgoing message to the mobile device is the user is not actively interacting with the mobile device. In particular embodiments, the server-side process may transmit at least one outgoing messages to the mobile device based on the notification mode and respective values of the one or more outgoing messages (404). For example, in response to a message from the mobile device indicating a trickle notification mode (e.g., the user is interacting with the mobile device), the server-side process can select outgoing messages with affinity scores greater than a pre-determined threshold (e.g., 0.4), and transmit the selected outgoing messages to the mobile device. In contrast, for example, in response to a message from the mobile device indicating a napping notification mode (e.g., the user is not interacting with the mobile device while the mobile device is in motion), the server-side process can select only high-affinity outgoing messages (e.g., messages most relevant to the user) by using a higher threshold (e.g., 0.8), and transmit the selected high-affinity outgoing messages to the mobile device.

In addition to transmitting to the mobile device outgoing messages with highest affinity scores, particular embodiments may store one or more remaining outgoing messages in a queue and transmit to the mobile device at a later time. In particular embodiments, the server-side process may select and store in a queue one or more of the one or more outgoing messages based on respective values of the one or more outgoing messages and the notification mode. For example, the server-side process can select outgoing messages with affinity scores of less than 0.4 and store the selected message in a queue if the notification mode is a trickle notification mode. For example, the server-side process can select outgoing messages with affinity scores of less than 0.8 and store the selected messages in a queue if the notification mode is a napping notification mode.

The server-side process may transmit at least one of the queued one or more outgoing messages to the mobile device at a later instance of time. For example, the server-side process may transmit at least one queued outgoing messages to the mobile device at a pre-determined time interval (e.g., every 30 minutes). For example, the server-side process may transmit at least one queued outgoing messages to the mobile device when a size of the queue is greater than a pre-determined threshold (e.g., when the queue has more than 20 queued messages). For example, the server-side process may transmit at least one queued message to the mobile device when a real-time outgoing messages (e.g., a phone call) is transmitted to the mobile device. For example, the server-side process may transmit at least one queued outgoing messages to the mobile device when a high affinity outgoing message (e.g., a message with an affinity score greater than 0.8) is transmitted to the mobile device. That is, the server-side process can piggy-back at least one queued outgoing messages with another real-time or high-affinity outgoing message.

Message Affinity Scoring

In one embodiment, a process running in a social networking environment requests a measure of affinity for a particular user from a module that implements an affinity function. The module, in one implementation, computes the requested measure of affinity by combining (e.g., adding) a weighted set of predictor functions, where each predictor function predicts whether the user will perform a different action. The weights may be provided by the process that requests the measure of affinity, which allows the requesting process to weight the predictor functions differently. In this sense, the affinity function is tunable by the requesting process for its own purpose. In one implementation, affinities may be computed for the purposes of computing an affinity score of an outgoing message to an intended recipient.

The predictor functions may predict whether a user will perform a particular action based on the user's interest in the action. For example, a predictor function may be derived based on a user's historical activity (such as interacting with other users utilizing the social networking system functionality discussed above, for example). Additionally, the predictor function may include a decay factor that causes the strength of the signal provided by the user's historical activity to decay with time. The predictor functions may predict any number of actions, which may be within or outside of the social networking system. For example, these actions may include various types of a user's communications, such as messages, posting of content, and commenting on content; various types of a user's observation actions, such as viewing profiles of other connections and viewing photos and content posted by other connections; and various types of coincidence information about two or more users, such as being tagged in the same photograph, checked in at the same location, and attending the same event. A predictor function may be determined using a machine learning algorithms trained on historical activity and past user responses or data farmed from users by exposing them to various options and measuring responses.

To predict the likely actions a user may take in a given situation, any process on the social networking system or outside may request a measure of affinity for a user by providing a set of weights. The measure of affinity may reflect the user's interest in other users, content, actions, advertisements, or any other objects in the social networking system. The weights may be binary or, more generally, any real number. In one implementation, messages intended for a communications device of a subject user that are transmitted or intermediated by the social networking system, for example, may be processed to compute an affinity between the subject user and the message. The affinity value can be appended to the message prior to transmission to the communications device. In other implementations, a process hosted on the communications device may access the affinity module to request the measure of affinity. In some implementations, the communications device may request affinities between the subject user of the communications device and one or more other users identified in a contacts database of the subject user (stored locally on the communications device or remotely on the social networking system). Revised affinity values can be obtained during subsequent synchronization processes. Communications device may use these affinity values for messages from the respective users. In other implementations, the communications device may monitor interactions locally and compute affinity values locally.

Figure 5:
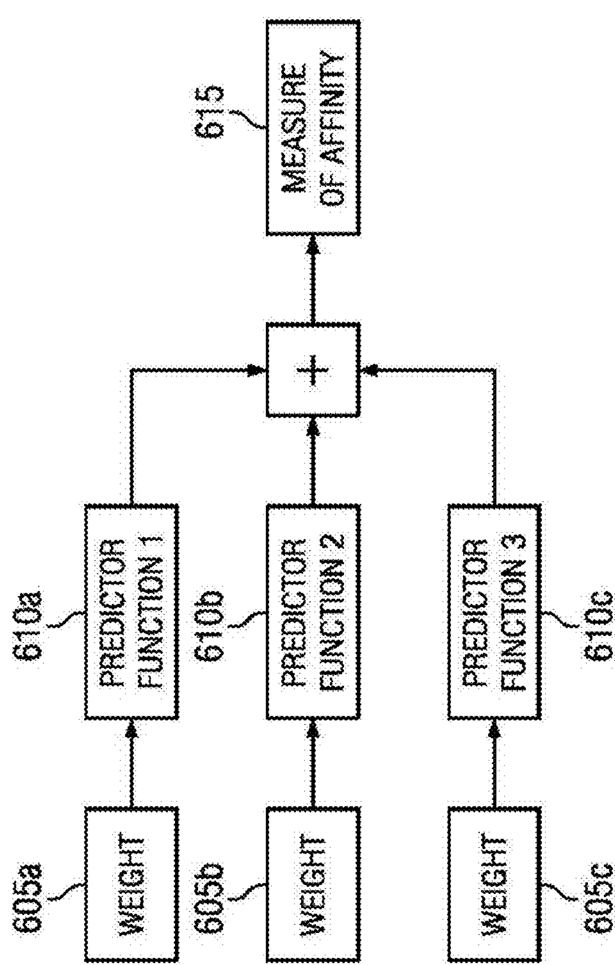
FIG. 5 illustrates an example block diagram for computing a measure of affinity for users in a social networking system.

FIG. 5 is a block diagram of a function for computing a measure of affinity for users in a social networking system. To compute a measure of affinity 615 that indicates a set of likely actions a user may want to take in any given situation, weights 105 are applied to predictor functions 610 and then combined to obtain a measure of affinity 615. Although FIG. 5 shows three predictor functions 610, any number of predictor functions can be employed in other embodiments of the invention. Additionally, in the embodiment of FIG. 5, the weighted predictor functions 610 are combined linearly. In different embodiments, other forms of combination may be used, including harmonic means, mean squares, and geometric means. Additionally, multiple measures of affinity 615 with varying weights 605 may be computed before predicting a user's actions.

The weights 605 of the affinity function enable it to be used by various processes in the social networking system environment for different purposes. For example, in a process that provides advertisements with social endorsements from a viewer's friends, an ad algorithm may use the measure of affinity 615 function to determine which of a user's connections to mention in the social endorsement or what type of actions to mention in the endorsement. The measure of affinity 615 may then be based on those predictor functions 610 that show how interested the user is in viewing the content posted by another user as well as one or more predictor functions 610 that show how interested the user is in various actions that may be mentioned in the social endorsement. The ad algorithm would thus provide relatively large weights for these predictor functions 610 so that the resulting measure of affinity would more accurately determine which social endorsements would be more interesting to the viewing user. The ad algorithm would then select the social endorsement using the resulting measure of affinity, thereby increasing the likelihood of conversion of the advertisement.

As a second example, in a process for a messaging application that intermediates communications between users, a social algorithm may use the measure of affinity 615 function to determine what level of interest a user may have in a message sent by a particular sending user. The measure of affinity 615 for this purpose may be based on predictor functions 610 that show how interested the user is in viewing the content posted by the user's connections and/or how often the users send messages to one another in general, as well as one or more predictor functions 610 that show how interested the user is posting or accessing different types of messages. Accordingly, the social algorithm would weight these predictor functions 610 relatively high so that the resulting measure of affinity would accurately determine which messages would be more interesting to the viewing user. Because of the highly tunable nature of the affinity function, enabled by the weighted predictor functions 610, it can be used for a number of different purposes.

Figure 6:
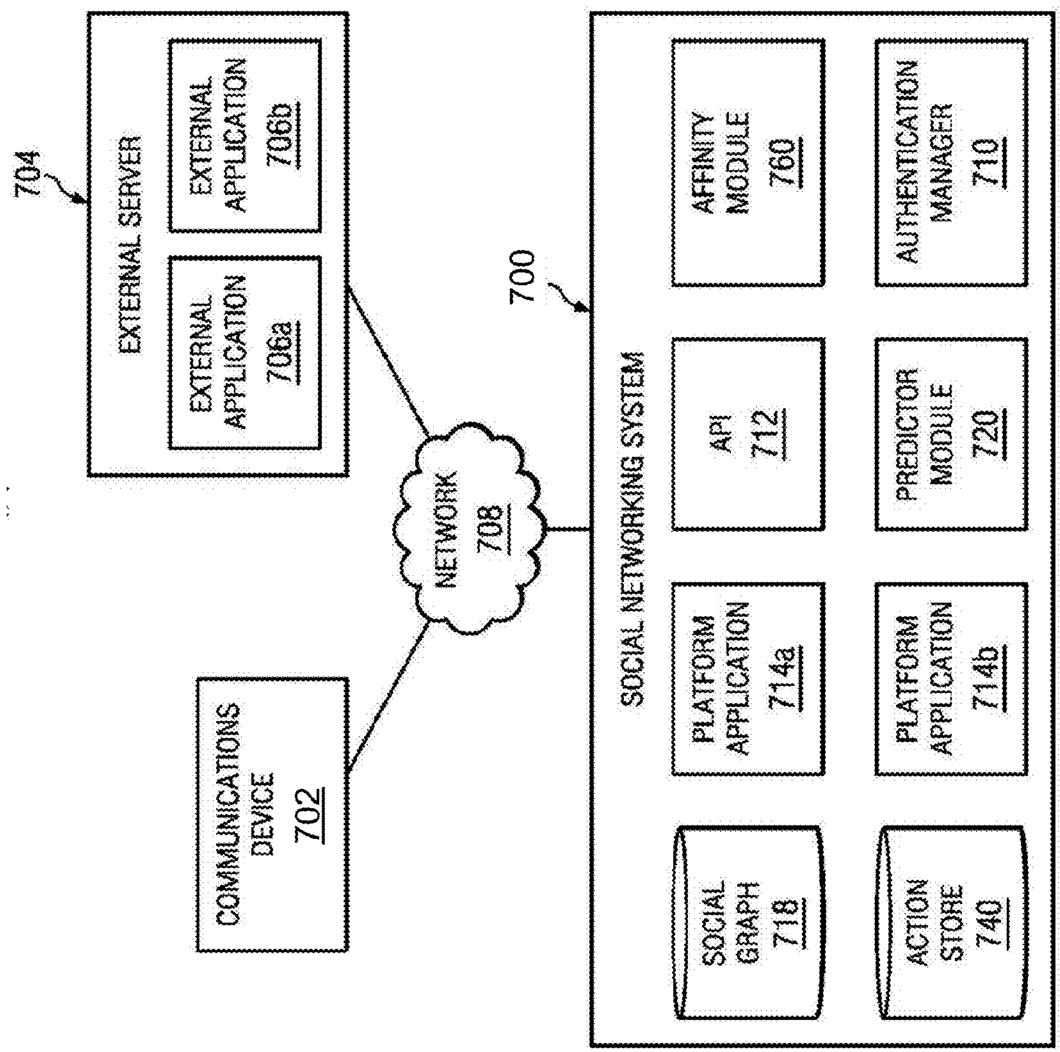
FIG. 6 illustrates an example social networking environment.

FIG. 6 is a high-level block diagram of an environment of a social networking system, according to one embodiment. FIG. 6 illustrates a social networking system 700, a user device 702, and an external server 704 connected by a network 708. The social graph 718 stores the connections that each user has with other users of the social networking system 100. The social graph 718 may also store second-order connections, in some embodiments. The connections may thus be direct or indirect. For example, if user A is a first-order connection of user B but not of user C, and B is a first-order connection of C, then C is a second-order connection of A on the social graph 718.

The action store 740 stores actions that have been performed by the users of the social networking system 700, along with an indication of the time associated with those actions and references to any objects related to the actions. Additionally, the action store 740 may store statistics for specified categories of actions. For example, for a given user the action store 740 may contain the number of wall posts in 30 days by a user, messages sent by the user, number of photos posted by the user in 30 days and number of distinct users that received the user's comments in 30 days. For a given connection between two users, user A and user B, the action store 740 may contain actions such as the number of profile page views from A to B, the number of photo page views from A to B, the number of messages from A to B, and the number of times A and B were tagged in the same photo, and these actions may be associated with a timestamp or may be filtered by a cutoff (e.g., 24 hours, 90 days, etc.). The actions recorded in the action store 740 may be farmed actions, which are performed by a user in response to the social networking system 700 providing suggested choices of actions to the user.

The predictor module 720 is responsible for computing a set predictor functions 610, which predict whether a user will perform a set of corresponding actions. As discussed above, each predictor function 610 may be representative of a user's interest in a particular action associated with the predictor function 610. The historical activity of a user may be used as a signal of a user's future interest in the same activity. In some embodiments, the predictor function 610 is generated using a machine learned algorithm that is trained using a user's historical activity associated with an action. The predictor module 720 thus provides a predictor function 610 for each of a set of actions, where a predictor function 610 may take as an input the a user's historical activity and then outputs a measure of the likelihood that the user will engage in the corresponding activity.

In some embodiments, one or more of the predictor functions 610 may use a decay factor in which the strength of the signal from a user's historical activity decays with time. Moreover, different predictor functions 610 may decay the historical activity at different rates. For example, some types of user activity, like adding a new connection, indicate a more persistent interest than other types of activity that indicate a more ephemeral interest, like commenting on another user's status. Therefore, the predictor functions 610 may decay the effect of historical activity based on an understanding about how that activity may become less relevant over the passage of time. Various decay mechanisms may be used for this purpose. For example, a predictor function 610 may use a mathematical function, such as an exponential decay, to decay the statistics about a user behavior. In another embodiment, the decay is implemented by selecting only those statistics about a user behavior that occurred within a specific window of time, such as 24 hours or 30 days.

In one embodiment, a predictor function 610 is realized as a ratio of two affine functions as shown in equation (1). The numerator and denominator affine functions take statistics of the user's historical activity as inputs.

$$P = \frac{a_0 + a_1 x_1 + a_2 x_2 + \ldots + a_n x_n}{b_0 + b_1 x_{n+1} + \ldots + b_m x_{n+m}} \quad (1)$$

where

P is the predictor function 610;

$a_i$ for i=0, 1, 2, . . . , N are the coefficients in the numerator affine function;

$b_i$ for i=0, 1, 2, . . . , M are the coefficients in the denominator affine function; and $x_i$ for i=1, 2, . . . , N+M are the statistics on a user's historical activity related to the predictor function P.

The denominator affine function can represent a normalization of the numerator affine function. For example, the number of comments made by a user may be normalized by, among other statistics, the number of times the user has been active on the social networking system 700. In particular, by altering $b_i$ for i=0, 1, 2, . . . , M the normalization pattern can be changed. In some embodiments, some or all of the coefficients, $a_i$ for i=0, 1, 2, . . . , N and $b_i$ for i=0, 1, 2, . . . , M, are determined through machine learning, which may be implemented by the predictor module 720. In a particular embodiment, a supervised machine learning algorithm is used with the training data obtained through farming, by providing a statistically significant number of users several options and monitoring their response. In another embodiment, the supervised machine learning algorithm is trained entirely based on historical user activity and past responses to choices of actions. The predictor functions 610 may also be non-linear. An example embodiment implements a predictor function 610 for a family where the predictor function 610 includes an 'if-then' construct for the members of the family—i.e., the predictor function 610 is computed differently depending on whether it is being computed for the parents or the children.

Some predictor functions 610 in the social networking system 700 may predict actions related to a user's communication in the social networking system 700. The statistics specifically related to communications may include broadcast data and communication data. Broadcast data may include, for example, the number of photos posted by the user in a given time period, the number of posts via applications by the user in a given time period, and any other communication that the user has posted or otherwise distributed to a group of other users. Communication data may include, for example, the number of likes from the user in a given time period, number of comments posted by user in a given time period, and any other information about the user's communication activities.

Similarly, some predictor functions 610 in the social networking system 700 may predict actions related to a user's observation of content in the social networking system 700. The statistics specifically related to observation may include, for example, the number of profile page views by the user of another user in a given time period, the number of photo views by the user in a given time period, the number of views of an advertisement containing a social endorsement in a given time period, and any other activity involving the viewing of content by the user.

Finally, some predictor functions 610 in the social networking system 700 may predict actions related to a user's coincidence with one or more other users of the social networking system. The statistics specifically related to coincidence may include, for example, a rate at which two or more users have been tagged in the same photograph, have checked in at the same location, or have confirmed (e.g., via RSVP) that they will be attending the same event, and any other activity involving an action or object in the social networking system related to multiple users.

The affinity module 760 provides a measure of affinity 615 based on input data about the user from the social networking system 700 using the predictor functions 610. In the embodiment of FIG. 5, the affinity module 760 sums the predictor functions linearly as shown in equation (2). However, other implementations are equally feasible.

$$A = \beta_0 + \beta_i P_1 + \beta_2 P_2 + \ldots + \beta_s P_s \quad (2)$$

where

A is the measure of affinity 615 requested;

$P_i$ for i=0, 1, 2, . . . , s are the s predictor functions 610 in the social networking system 700; and $\beta_i$ for i=1, 2, . . . , s are the weights 605 assigned to the s predictor functions 610 in the social networking system 100.

Figure 7:
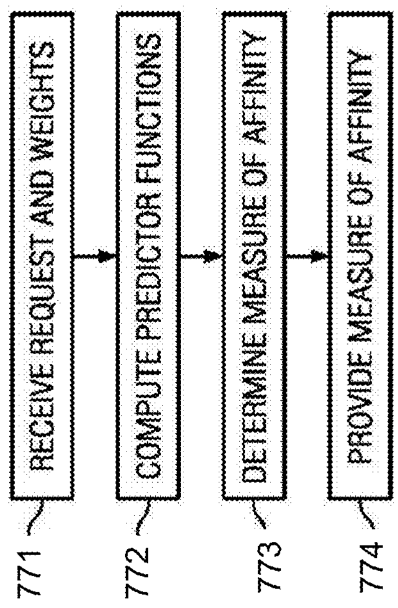
FIG. 7 illustrates an example method for computing a measure of affinity for a user based on a request.

FIG. 7 illustrates an embodiment of a method for computing a measure of affinity 615 for a user based on a request. The social networking system 700 first receives 771 a request from a process for a measure of affinity 615 for a user along with the weights 605 to be assigned to the various predictor functions 610. The request may include the message for which an affinity score is desired or one or more attributes extracted from the message. The social networking system 700 then computes 772 the predictor functions 610 for the user in the predictor module 772. The predictor functions 610 previously computed are combined to determine 773 an overall measure of affinity 615, which is then provided 774 to the requesting process.

Figure 8:
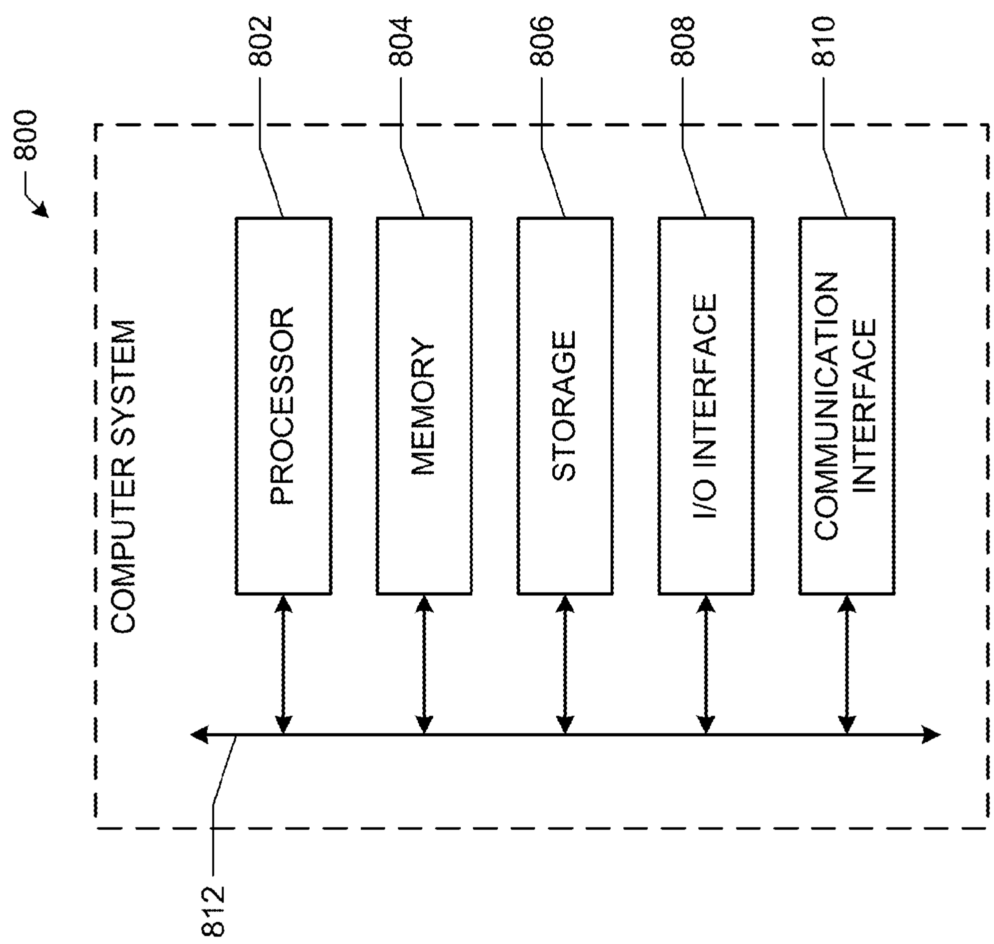
FIG. 8 illustrates an example computer system.

FIG. 8 illustrates an example computer system 800, which may be used with some embodiments of the present invention. This disclosure contemplates any suitable number of computer systems 800. This disclosure contemplates computer system 800 taking any suitable physical form. As example and not by way of limitation, computer system 800 may be an embedded computer system, a system-on-chip (SOC), a desktop computer system, a mobile computer system, a game console, a mainframe, a mesh of computer systems, a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. In particular embodiments, memory 804 includes main memory for storing instructions for processor 802 to execute or data for processor 802 to operate on. As an example and not by way of limitation, computer system 800 may load instructions from storage 806 to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM).

In particular embodiments, storage 806 includes mass storage for data or instructions. As an example and not by way of limitation, storage 806 may include an HDD, a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), or flash memory or a combination of two or more of these.

In particular embodiments, I/O interface 808 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, microphone, display, touch screen, mouse, speaker, camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) for communicating with an Ethernet or other wire-based network or a wireless NIC (WNIC) for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (e.g., a BLUETOOTH WPAN), a WI-FI network (e.g., a 802.11a/b/g/n WI-FI network,), a WI-MAX network, a cellular network (e.g., a Global System for Mobile Communications (GSM) network, a Long Term Evolution (LTE) network), or other suitable wireless network or a combination of two or more of these.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an INFINIBAND interconnect, a low-pin-count (LPC) bus, a memory bus, a Peripheral Component Interconnect Express or PCI-Express bus, a serial advanced technology attachment (SATA) bus, a Inter-Integrated Circuit (I2C) bus, a Secure Degital (SD) memory interface, a Secure Digital Input Output (SDIO) interface, a Universal Serial Bus (USB) bus, a General Purpose Input/Output (GPIO) bus, or another suitable bus or a combination of two or more of these. Bus 812 may include one or more buses 812, where appropriate.

Figure 9:
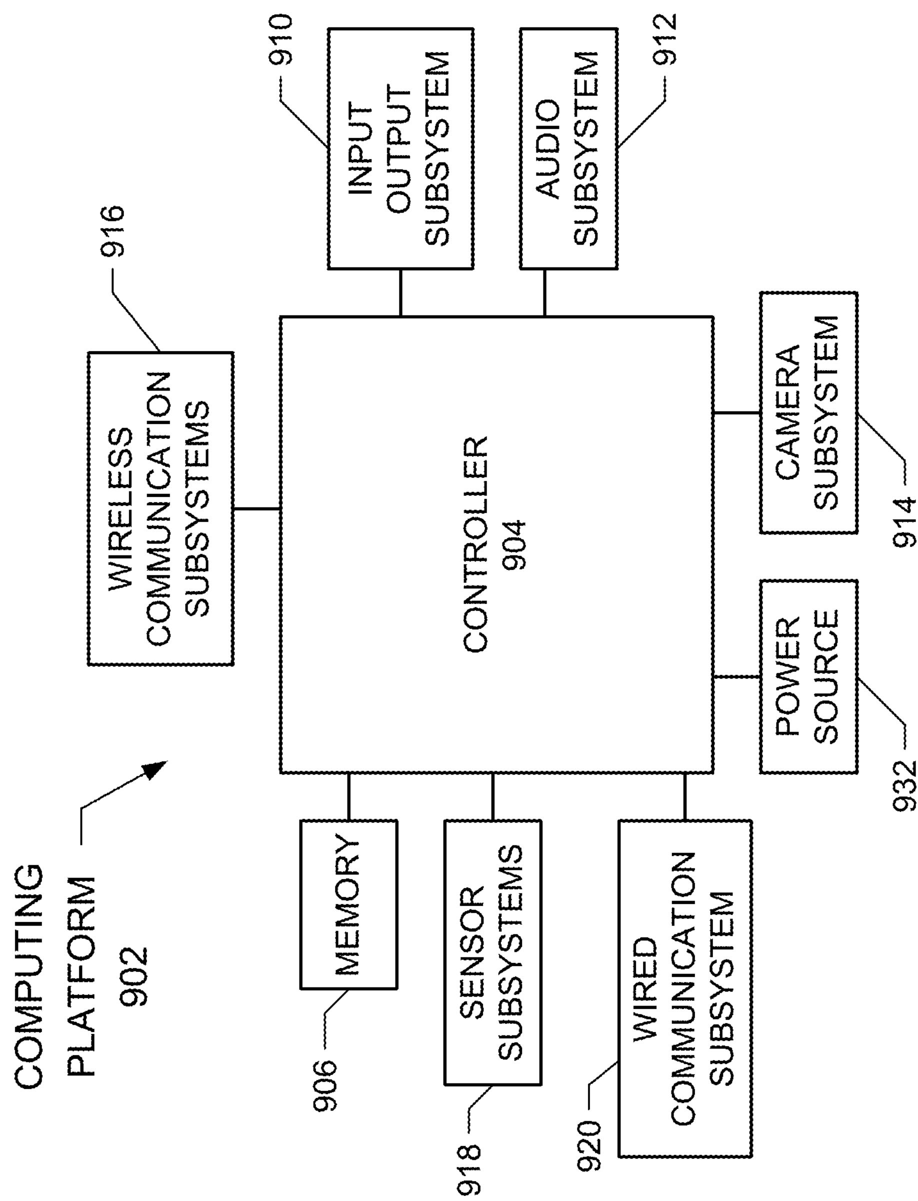
FIG. 9 illustrates an example mobile device platform.

The client-side functionality described above can be implemented as a series of instructions stored on a computer-readable storage medium that, when executed, cause a programmable processor to implement the operations described above. While the mobile device 122 may be implemented in a variety of different hardware and computing systems, FIG. 9 shows a schematic representation of the main components of an example computing platform of a client or mobile device, according to various particular embodiments. In particular embodiments, computing platform 902 may comprise controller 904, memory 906, and input output subsystem 910. In particular embodiments, controller 904 which may comprise one or more processors and/or one or more microcontrollers configured to execute instructions and to carry out operations associated with a computing platform. In various embodiments, controller 904 may be implemented as a single-chip, multiple chips and/or other electrical components including one or more integrated circuits and printed circuit boards. Controller 904 may optionally contain a cache memory unit for temporary local storage of instructions, data, or computer addresses. By way of example, using instructions retrieved from memory, controller 904 may control the reception and manipulation of input and output data between components of computing platform 902. By way of example, controller 904 may include one or more processors or one or more controllers dedicated for certain processing tasks of computing platform 902, for example, for 2D/3D graphics processing, image processing, or video processing.

Controller 904 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code and/or data may be physically stored within memory 906 that is operatively coupled to controller 904.

Memory 906 may encompass one or more storage media and generally provide a place to store computer code (e.g., software and/or firmware) and data that are used by computing platform 902. By way of example, memory 906 may include various tangible computer-readable storage media including Read-Only Memory (ROM) and/or Random-Access Memory (RAM). As is well known in the art, ROM acts to transfer data and instructions uni-directionally to controller 904, and RAM is used typically to transfer data and instructions in a bi-directional manner. Memory 906 may also include one or more fixed storage devices in the form of, by way of example, hard disk drives (HDDs), solid-state drives (SSDs), flash-memory cards (e.g., Secured Digital or SD cards), among other suitable forms of memory coupled bi-directionally to controller 904. Information may also reside on one or more removable storage media loaded into or installed in computing platform 902 when needed. By way of example, any of a number of suitable memory cards (e.g., SD cards) may be loaded into computing platform 902 on a temporary or permanent basis.

Input output subsystem 910 may comprise one or more input and output devices operably connected to controller 904. For example, input output subsystem may include keyboard, mouse, one or more buttons, and/or, display (e.g., liquid crystal display (LCD), or any other suitable display technology). Generally, input devices are configured to transfer data, commands and responses from the outside world into computing platform 902. The display is generally configured to display a graphical user interface (GUI) that provides an easy to use visual interface between a user of the computing platform 902 and the operating system or application(s) running on the mobile device. Generally, the GUI presents programs, files and operational options with graphical images. During operation, the user may select and activate various graphical images displayed on the display in order to initiate functions and tasks associated therewith. Input output subsystem 910 may also include touch based devices such as touch pad and touch screen. A touchpad is an input device including a surface that detects touch-based inputs of users. Similarly, a touch screen is a display that detects the presence and location of user touch inputs. Input output system 910 may also include dual touch or multi-touch displays or touch pads that can identify the presence, location and movement of more than one touch inputs, such as two or three finger touches.

In particular embodiments, computing platform 902 may additionally comprise audio subsystem 912, camera subsystem 912, wireless communication subsystem 916, sensor subsystems 918, and/or wired communication subsystem 920, operably connected to controller 904 to facilitate various functions of computing platform 902. For example, Audio subsystem 912, including a speaker, a microphone, and a codec module configured to process audio signals, can be utilized to facilitate voice-enabled functions, such as voice recognition, voice replication, digital recording, and telephony functions. For example, camera subsystem 912, including an optical sensor (e.g., a charged coupled device (CCD), image sensor), can be utilized to facilitate camera functions, such as recording photographs and video clips. For example, wired communication subsystem 920 can include a Universal Serial Bus (USB) port for file transferring, or a Ethernet port for connection to a local area network (LAN). Additionally, computing platform 902 may be powered by power source 932.

Wireless communication subsystem 916 can be designed to operate over one or more wireless networks, for example, a wireless PAN (WPAN) (e.g., a BLUETOOTH), a WI-FI network (e.g., an 802.11a/b/g/n network), a WI-MAX network, a cellular network (such as, for example, a Global System for Mobile Communications (GSM) network, a Long Term Evolution (LTE) network). Additionally, wireless communication subsystem 916 may include hosting protocols such that computing platform 902 may be configured as a base station for other wireless devices. Other input/output devices may include an accelerometer that can be used to detect the orientation of the device.

Sensor subsystem 918 may include one or more sensor devices to provide additional input and facilitate multiple functionalities of computing platform 902. For example, sensor subsystems 918 may include GPS sensor for location positioning, altimeter for altitude positioning, motion sensor for determining orientation of a mobile device, light sensor for photographing function with camera subsystem 914, temperature sensor for measuring ambient temperature, and/or biometric sensor for security application (e.g., fingerprint reader).

In particular embodiments, various components of computing platform 902 may be operably connected together by one or more buses (including hardware and/or software). As an example and not by way of limitation, the one or more buses may include an Accelerated Graphics Port (AGP) or other graphics bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Peripheral Component Interconnect Express PCI-Express bus, a serial advanced technology attachment (SATA) bus, a Inter-Integrated Circuit (I2C) bus, a Secure Degital (SD) memory interface, a Secure Digital Input Output (SDIO) interface, a Universal Serial Bus (USB) bus, a General Purpose Input/Output (GPIO) bus, an Advanced Microcontroller Bus Architecture (AMBA) bus, or another suitable bus or a combination of two or more of these.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:

by one or more computing device, receiving, from a mobile computing device of a first user, a first message indicating a notification mode of the mobile device, wherein the notification mode is based on user-interface mode of the mobile computing device;

by one or more computing device, accessing one or more services with one or more messages to send the first user;

by one or more computing device, determining a value of each of the message; and by one or more computing device, sending to the mobile computing device at least one of the messages based on the notification mode and the values of the messages;

wherein sending at least one of the messages in the queue to the mobile computing device occurs when a size of the queue is greater than a pre-determined threshold.

2. The method of claim 1, wherein the value of a message is based on an affinity between the first user and a sender of the message.

3. The method of claim 1, wherein sending at least one of the messages in the queue to the mobile computing device occurs at a pre-determined time interval.

4. The method of claim 1, wherein sending at least one of the messages in the queue to the mobile computing device occurs when a real-time message is to be sent to the mobile computing device.

5. One or more computer-readable non-transitory storage media embodying software that is operable when executed to:

receive, from a mobile computing device of a first user, a first message indicating a notification mode of the mobile device, wherein the notification mode is based on a user-interface mode of the mobile computing device;

access one or more services with one or more messages to send to the first user;

determine a value of each of the messages; and to the mobile computing device at least one of the messages based on the notification mode and the values of the messages;

wherein, to transmit to the mobile computing device at least one of the outgoing messages, the software is further operable when executed to:

select and store in a queue one or more of the messages based on their values; and send at least one of the messages in the queue to the mobile computing device at a later time;

wherein sending at least one of the messages in the queue to the mobile computing device occurs when a size of the queue is greater than a pre-determined threshold.

6. The media of claim 5, wherein the value of a message is based on an affinity between the first user and a sender of the message.

7. The media of claim 5, wherein sending at least one of the messages in the queue to the mobile computing device occurs at a pre-determined time interval.

8. The media of claim 5, wherein sending at least one of the messages in the queue to the mobile computing device occurs when a real-time message is to be sent to the mobile computing device.

9. A system comprising:

One or more processors; and a memory coupled to the processors comprising instructions executable by the processors, the processors being operable when executing the instructions to:

receive, from a mobile computing device of a first user, a first message indicating a notification mode of the mobile device, wherein the notification mode is based on a user-interface mode of the mobile computing device;

access one or more services with one or more messages to send to the first user;

determine a value of each of the messages; and to the mobile computing device at least one of the messages based on the notification mode and the values of the messages;

wherein, to transmit to the mobile computing device at least one of the outgoing messages, the processors are further operable when executing the instructions to:

select and store in a queue one or more of the messages based on their values; and send at least one of the messages in the queue to the mobile computing device at a later time;

wherein sending at least one of the messages in the queue to the mobile computing device occurs when a size of the queue is greater than a pre-determined threshold.

10. The system of claim 9, wherein the value of a message is based on an affinity between the first user and a sender of the message.

11. The system of claim 9, wherein sending at least one of the messages in the queue to the mobile computing device occurs at a pre-determined time interval.

12. The system of claim 9, wherein sending at least one of the messages in the queue to the mobile computing device occurs when a real-time message is to be sent to the mobile computing device.

* * * * *